O. A. SMITH.
VALVE STEM CAP.
APPLICATION FILED DEC. 29, 1914.
1,192,352.
Patented July 25, 1916.
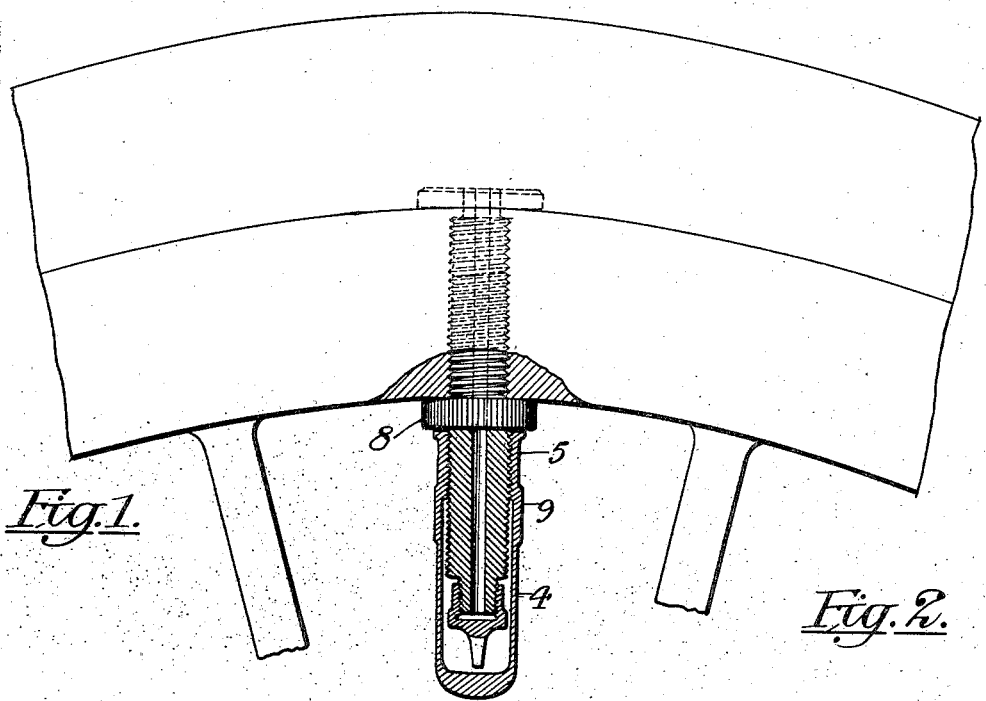
Fig.1.
Fig.2.
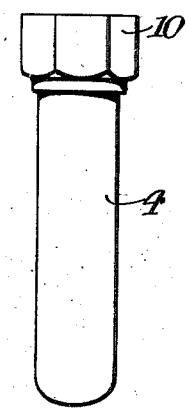
Fig.3.
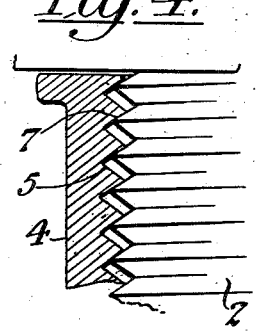
Fig.4.
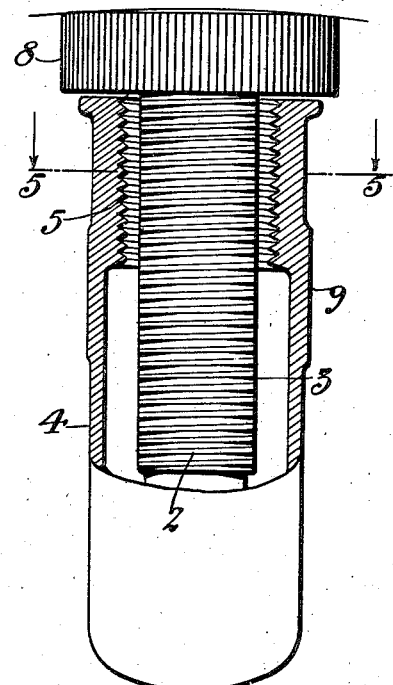
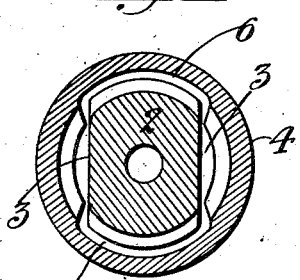
Fig.5.
Witnesses:
Titus K. Irone.
Walter L. Bakelar.
Inventor:
Oscar A. Smith.
by his Attorney.
G. F. Weed.

UNITED STATES PATENT OFFICE.

OSCAR A. SMITH, OF CLEVELAND, OHIO, ASSIGNOR OF ONE-HALF TO EDWIN C. HENN, OF CLEVELAND, OHIO.

VALVE-STEM CAP.

1,192,352.          Specification of Letters Patent.      Patented July 25, 1916.

Application filed December 29, 1914. Serial No. 879,435.

*To all whom it may concern:*

Be it known that I, OSCAR A. SMITH, a citizen of the United States, residing at Cleveland, in the county of Cuyahoga and State of Ohio, have invented certain new and useful Improvements in Valve-Stem Caps, of which the following is a specification.

This invention relates to improvements in valve stem caps, and more particularly to improvements in that class of valve stem caps which are used in connection with pneumatic tires, such as automobile tires, the object of the invention being to provide a protecting cap for such valve stems which can be placed on the stem and very easily, quickly and firmly locked thereon against displacement, without the necessity of screwing the cap for the entire length of the stem, and by means of which the time consumed in removing and replacing the cap is reduced to a mere fraction of the time heretofore necessary to perform this operation, and which cap can be readily and quickly produced on an automatic screw machine like the ordinary caps.

In the drawings accompanying and forming part of this specification, Figure 1 is a side elevation, partly broken away, of a portion of a felly of a wheel showing this improved valve stem cap applied thereto, the cap and stem being shown in section; Fig. 2 is an enlarged, partly sectional side view of the cap, showing the same locked on a valve stem; Fig. 3 is a side view of one form of cap, showing the exterior thereof provided with a wrench-receiving portion; Fig. 4 is an enlarged fragmentary view showing the difference in pitch between the thread on the cap and that on the valve stem; and Fig. 5 is a cross-sectional view taken in line 5—5, Fig. 2, showing the arrangement of threads on the stem and cap in their relative positions before the cap is locked on the stem.

Similar characters of reference indicate corresponding parts in the different figures of the drawings.

All valve stems now in practical use for inner tubes of automobile tires are flattened on two sides and threaded to a standard diameter and pitch, and the protecting caps are threaded to the same pitch and screwed on such stems for the entire length of the stem which projects through the felly of the wheel. Moreover, the valve stem must be locked to the felly of the wheel in some way to prevent the inner tube from "creeping". The constant friction of the tube in the casing exerts a constant pull on the valve stem tending to pull it through, and if the stem is not locked this constant strain will eventually bend it and thus ruin the tube. When the tire is mounted directly on the wheel a double lock is required, because the stem has only a narrow support in the felly, and for this purpose a round knurled nut 8, in conjunction with the threaded cap, is usually used to insure a good lock, while when the tire is mounted on a demountable rim and then attached to the wheel the valve stem goes through the demountable rim and the felly and therefore does not require the double lock, since it has a considerably longer bearing by passing through the demountable rim and the felly, and consequently merely a washer having a bore corresponding in shape with the stem is used and the protecting cap screwed tightly against it. In the present improvement the usual form of threaded stem 2 is used, having opposite portions thereof flattened, as at 3. In connection with this stem I employ a protecting cap 4, which is threaded only at one portion of its length, as for instance its outer end, as at 5, Figs. 1 and 2, and these threads do not extend around the entire inner wall of the bore of the cap, but are broken away at opposite portions, as shown at 6, Fig. 5, corresponding to the threaded portions 3 of the valve stem. The purpose of thus forming the threads in the bore of the cap is to enable the cap to be slid over the stem to the end thereof without the necessity of screwing or unscrewing such cap, and by a single turn or twist of the cap to bring its threads into engagement with the threads on the stem thereby to lock the cap on such stem.

In order to provide the proper "camming" action between the threads on the stem and those in the cap, thereby to effectively lock the stem and cap together, I provide the cap with a thread of a different pitch from that of the stem, as shown clearly at 7, Fig. 4, and in practice I have found that the most effective action is produced by providing a difference in pitch of one-half thread to the inch between the thread on the stem and that in the cap, but I do not desire to confine myself to this particular proportion, the essential idea being to provide threads having a sufficient difference in pitch to produce the proper camming action for effectively locking the cap and stem together, and if under certain condtions a greater or less difference in pitch is found desirable I regard it as fully within the purview of my improvement to change such proportions to suit the conditions. Neither do I desire to confine my invention to giving the greater pitch to the threads in the cap, as this arrangement may be reversed if found desirable without departing from the scope of my invention.

The cap shown in Figs. 1 and 2 is provided with the usual knurled portion 9 to permit the same to be readily turned by hand. This style of cap being best adapted for use in connection with the double locked stem which is usually provided for holding tubes that are mounted directly on the felly of the wheel, while the cap shown in Fig. 3 is provided with a wrench-receiving portion 10 and is best adapted for use in connection with the stems of tubes that are mounted on a demountable rim and then placed on the wheel.

The cap is placed on the stem by merely turning the cap until the unthreaded portions thereof are in alinement with the threaded portions of the stem, and vice versa, and then pushing the cap down on the stem as far as it will go, whereupon the cap is locked in position by grasping it with the hand and giving it a twist to bring its threads into engagement with the threads of the stem and turning it as far as it will go. The difference in pitch between the threads on the stem and those in the cap will cause the proper camming action between the threads thereby to effectively lock the cap on the stem and hold the stem in proper position in the felly of the wheel.

From the foregoing it will be observed that I have provided an improved cap by means of which, in the case of tires which are fastened directly to the wheel, a large proportion of the time consumed in tightening the nut and screwing on the cap is saved, since it is merely necessary to screw the nut 8 up tight and then slip on the cap and give it a twist, while in the case of tires that are mounted on a demountable rim and then placed on the felly of the wheel practically all of the time heretofore consumed in screwing on the cap is saved, since it is merely necessary to slip the cap over the stem and give it a twist, and that this very considerable saving of time is accomplished without disturbing in the least degree the essential feature of locking the tube against creeping, while also decreasing to a considerable extent the cost of manufacture, since it is only necessary to thread a very small portion of the length of the cap.

I claim as my invention:

1. The combination with a valve stem having a mutilated thread, of a valve cap longer than the projecting portion of said stem and having a mutilated thread interior, the threads of said cap being of greater pitch than the threads of said stem whereby there is a frictional locking between said cap and stem.

2. The combination with a valve stem having mutilated threads throughout its length, of a valve cap of greater length than the projecting portion of said stem and having mutilated threads throughout a portion of its length, the threads of one of said parts being of greater pitch than the threads of the other part.

3. The combination with a valve stem having one or more flat portions and a mutilated thread portion, of a valve cap having a mutilated thread portion and a smooth portion, the threads of one of said parts being of different pitch than the threads of the other part.

4. The combination with a valve stem having one or more flat portions and a mutilated thread portion, of a valve cap having a mutilated thread portion and a smooth portion, the threads of said cap being of different pitch than the threads of the stem.

5. The combination with an inflatable tire having a stem adapted to carry a valve, said stem having one or more interrupted or mutilated thread portions, of a valve cap similarly formed, the coöperating mutilated threads of said parts formed to provide locking surfaces in addition to the usual coöperating action of the threads.

6. An integral cylindrical valve cap having one or more integral interrupted or mutilated thread portions, the pitch of the thread being different from that of the thread on the stem for which the cap is designed, in such manner as to cause the cap to lock upon such stem.

7. An integral cylindrical valve cap having one or more integral interrupted or mutilated thread portions located adjacent to the open end of the cap, the pitch of the thread being different from that of the thread on the stem for which the cap is designed, in such manner as to cause the cap to lock upon such stem.

8. The combination with an inflatable tire having a stem adapted to carry a valve, said stem having one or more interrupted or mutilated thread portions, of a valve cap similarly formed, the threads of one of said parts having a different pitch than the other.

9. The combination with an inflatable tire having a stem adapted to carry a valve, said stem having one or more interrupted or mutilated thread portions, of a valve cap similarly formed, one of said parts having an extra thread thereon to the inch.

10. The combination with an inflatable tire having a stem adapted to carry a valve, said stem having one or more interrupted or mutilated thread portions, of a valve cap similarly formed, said cap having an extra thread to the inch.

Signed at Cleveland, in the county of Cuyahoga and State of Ohio, this 24th day of December, 1914.

OSCAR A. SMITH.

Witnesses:
JOHN L. MORRISSEY,
E. C. WOOLGAR.